US012172454B2

(12) United States Patent
Li

(10) Patent No.: US 12,172,454 B2
(45) Date of Patent: Dec. 24, 2024

(54) STAMP TOOL

(71) Applicant: Parric Ningbo Stationery and Gifts Mfg. Co., Ltd., Zhejiang (CN)

(72) Inventor: Fuping Li, Zhejiang (CN)

(73) Assignee: Parric Ningbo Stationary and Gifts Mfg. Co., Ltd., Ningbo (CN)

( * ) Notice: Subject to any disclaimer, the term of this patent is extended or adjusted under 35 U.S.C. 154(b) by 0 days.

(21) Appl. No.: 18/262,539

(22) PCT Filed: Mar. 16, 2022

(86) PCT No.: PCT/CN2022/081051

§ 371 (c)(1),
(2) Date: Jul. 21, 2023

(87) PCT Pub. No.: WO2023/130575

PCT Pub. Date: Jul. 13, 2023

(65) Prior Publication Data

US 2024/0075763 A1 Mar. 7, 2024

(30) Foreign Application Priority Data

Jan. 7, 2022 (CN) ........................ 202210016186.4

(51) Int. Cl.
*B41K 3/46* (2006.01)

(52) U.S. Cl.
CPC ..................................... *B41K 3/46* (2013.01)

(58) Field of Classification Search
CPC .... B41F 1/04; B41K 1/00; B41K 3/00; B41K 3/02; B41K 3/04; B41K 3/32; B41K 3/44; B41K 3/46; B41K 3/62; B41L 15/06; B44B 5/00; B44B 5/02; B44B 5/0052; B44B 5/0085
See application file for complete search history.

(56) References Cited

U.S. PATENT DOCUMENTS

| | | | | |
|---|---|---|---|---|
| 8,136,232 | B1 * | 3/2012 | Yu | H05K 13/0069 29/760 |
| 10,960,696 | B1 * | 3/2021 | Garza | B41K 3/44 |
| 2016/0200126 | A1 * | 7/2016 | Myska | B44B 5/0085 101/407.1 |
| 2019/0092062 | A1 * | 3/2019 | Li | B41K 3/02 |
| 2021/0260900 | A1 * | 8/2021 | Ericson | E05D 7/1072 |

FOREIGN PATENT DOCUMENTS

| | | | | |
|---|---|---|---|---|
| CN | 108749295 A | * | 11/2018 | B41F 17/00 |
| CN | 109353135 A | * | 2/2019 | B41K 3/04 |
| CN | 217495650 U | * | 9/2022 | |

* cited by examiner

*Primary Examiner* — Christopher E Mahoney
*Assistant Examiner* — Marissa Ferguson-Samreth
(74) *Attorney, Agent, or Firm* — Wang Law Firm, Inc.

(57) ABSTRACT

A seal stamping machine has two pressing plates disposed face to face, each plate being capable of compressing a stamp, and a stamping carrier is located between the plates. The first plate has a plurality of positioning holes and the second plate has a corresponding plurality of elastic positioning mechanisms, each elastic positioning mechanism corresponding to one of the plurality of positioning holes; when the plates are pressed together, the elastic positioning mechanisms urge the first plate away from the second plate. The plates are aligned by the positioning holes and the elastic positioning mechanisms in order to align the stamping carrier and avoid displacement. A seal is thus uniformly stamped.

13 Claims, 10 Drawing Sheets

STAMP TOOL

TECHNICAL FIELD OF THE INVENTION

The invention relates to the technical field of handicraft tools, particularly to the technical field of pattern stamping, and in particular to a seal stamping machine.

BACKGROUND OF THE INVENTION

The seal stamping machine is a device that transfers the ink to a stamping carrier through a graphic by squeezing two plates. By using seal stamping machines, consumers can stamp their favorite patterns on paper, clothes or other stamping carriers. For example, a Chinese Patent CN109353135A (patent NO: CN201811045056.3) disclosed a stamping machine. The stamping machine comprises a main body, wherein the main body comprises a soleplate for placing a carrier and a seal, a pressure plate that cooperates with the soleplate to press the carrier and the seal, and a magnetic mechanism that generates a mutual attraction force between the pressure plate and the soleplate, and an operating space for placing the carrier and the seal is defined on an upper surface of the soleplate.

Compared with ordinary manual seal stamping machines, the seal stamping machine can obtain richer stamp patterns, and is more convenient to use. However, the exiting seal stamping machines generally have the following problems: (1) the positioning between two plates is unstable, and the seal is easy to displace in the stamping process, thereby resulting in the dislocation or blur of the stamped pattern and affecting the stamping quality; (2) the seal is stressed unevenly, so that the stamped pattern has different shades of color and needs to be stamped again, and the stamping quality and the user's experience are affected; and, (3) if the pattern is stamped incomplete for the first time and needs to be stamped again, it is very difficult to ensure that the patterns stamped for two times are overlapped since the previous positioning cannot be achieved accurately.

SUMMARY OF THE INVENTION

It is a first object of the present invention to provide a seal stamping machine which is convenient for positioning.

It is a second object of the present invention to provide a seal stamping machine which is convenient for positioning seals and stamping carriers.

It is a third object of the present invention to provide a seal stamping machine which does not limit the size of stamping carriers.

For achieving at least one of the above objects: the seal stamping machine comprises a first plate and a second plate disposed face to face, the first plate and the second plate being capable of compressing a stamp and a stamping carrier located between the first plate and the second plate; wherein, the first plate has a plurality of positioning holes; a plurality of elastic positioning mechanisms disposed on the second plate, each positioning mechanism corresponding to one of the plurality of positioning holes; when the first plate is pressed toward the second plate, the elastic positioning mechanisms urge the first plate away from the second plate.

Preferably, each elastic positioning mechanism comprises a vertically disposed column, the column has a positioning protrusion atop the column, each positioning protrusion matches the corresponding positioning hole in size and is capable of being inserted into the corresponding positioning hole; and each column has a placement portion under the corresponding positioning protrusion, the first plate is placed on the placement portions of the plurality of columns after the plurality of positioning protrusions are disposed inside the corresponding plurality of positioning holes of the first plate. Thus, when the positioning protrusion is clamped into the positioning holes, the firm connection between the elastic positioning mechanisms and the positioning holes can be realized, and the firm connection between the first plate and the second plate can thus be realized.

Preferably, each positioning protrusion extends upward from a center of a top surface of the column, the top surface of each column around the positioning protrusion is inclined downward forming the placement portion; and each positioning hole has a placement recess extending outward at a bottom of the positioning hole for receiving the corresponding placement portion; in a mounted state, each positioning protrusion is positioned inside the corresponding positioning hole, and each placement portion of the column is positioned inside the corresponding placement recess. On one hand, by clamping the placement portion into the placement recess, it is advantageous to guide the positioning protrusions into the positioning holes; on the other hand, by clamping the placement portion into the placement recess, the positioning between the positioning holes and the positioning protrusions can be firmer.

Preferably, each elastic positioning mechanism further comprises a first mounting recess vertically disposed on the top surface of the second plate, and a first reset spring disposed inside the first mounting recess; a bottom of the column is located inside the first mounting recess and capable of moving up and down inside the first mounting recess, and the first reset spring is limited between a bottom of the first mounting recess and the bottom of the column. On one hand, the first reset spring and the column can be mounted firmly; on the other hand, the first reset spring can fully provide an elastic force in the pressing process.

Preferably, a first guide sleeve is disposed inside the first mounting recess, the first guide sleeve has a plurality of first guide grooves vertically formed at intervals on an annular inner surface of the first guide sleeve; a first guide sleeve is disposed inside the first mounting recess, the first guide sleeve has a plurality of first guide grooves vertically formed at intervals on an annular inner surface of the first guide sleeve; correspondingly, the column has a plurality of first guide protrusions protruding at intervals on a periphery of the bottom of the column, each first guide protrusion is inserted into the corresponding first guide groove and is capable of moving up and down along the corresponding first guide groove. By enabling the first guide protrusions on the column to be inserted into the first guide grooves on the first guide sleeve, the column can move up and down more stably, the seal can be subjected to a more stable downward pressure, and the stamped character or pattern can be more uniform and complete.

Preferably, a plurality of elastic reset mechanisms is disposed on the first plate or the second plate, when the first plate is pressed down, the plurality of elastic reset mechanisms and the plurality of elastic positioning mechanisms are compressed together, and together urge the first plate away from the second plate. By using the elastic reset mechanisms with the elastic positioning mechanisms, the seal can be stressed more uniformly in the stamping process, and the stamping quality can be further improved.

Preferably, the plurality of elastic reset mechanisms is disposed on the first plate, each elastic reset mechanism comprises a second mounting recess vertically disposed on a bottom surface of the first plate, a second reset spring disposed inside the second mounting recess, and a press cap having a top and a free end; the top of the press cap is inserted into the corresponding second mounting recess and is capable of moving up and down inside the corresponding second mounting recess, and the second reset spring is limited between a top of the second mounting recess and the top of the press cap. Thus, on one hand, the second reset spring and the column can be mounted firmly; on the other hand, the second reset spring can fully provide an elastic force in the pressing process.

Preferably, a second guide sleeve is disposed inside the second mounting recess, the second guide sleeve has a plurality of second guide grooves vertically formed at intervals on an annular inner surface of the second guide sleeve; correspondingly, the press cap has a plurality of second guide protrusions protruding at intervals on a periphery of the top of the press cap, each second guide protrusion is inserted into the corresponding second guide groove and is capable of moving up and down along the corresponding second guide groove. By enabling the second guide protrusions on the press cap to be inserted into the second guide grooves on the second guide sleeve, the press cap can move up and down more stably, and the seal can be stressed more uniformly.

Preferably, an antiskid pad is disposed at the free end of the press cap. By arranging the antiskid pad, the first plate can be prevented from moving horizontally on the stamping carrier, and the stability of stamping and positioning can be improved.

Preferably, at least two elastic positioning mechanisms are located at intervals at one side of the second plate, at least two elastic reset mechanisms are located at intervals at the side of the second plate opposite to the two elastic positioning mechanisms, and correspondingly, at least two positioning holes on the first plate correspond to the elastic positioning mechanisms. On one hand, the connection between the first plate and the second plate can be firmer; on the other hand, the seal can be stressed more uniformly.

Preferably, the second plate comprises a plate body and a positioning block, the positioning block is detachably disposed at one end of a top surface of the plate body, a bottom surface of the positioning block is a plane, a clamping space for clamping a stamping carrier is defined between the bottom surface of the positioning block and the top surface of the plate body, and, the plurality of elastic positioning mechanisms is disposed on the positioning block. Since the elastic positioning mechanisms are arranged on the positioning block and the bottom surface of the positioning block forms a clamping space with the upper surface of the plate body, the elastic positioning mechanisms will not limit the area of the stamping carrier, so that the area of the stamping carrier of the present invention can be theoretically infinite.

Preferably, the positioning block and the plate body are magnetically connected to each other through a magnetic component, so that it is convenient for the assembly and disassembly of the positioning block and the plate body.

Preferably, the magnetic component comprises a first magnetic block embedded in the bottom surface of the positioning block and a second magnetic block embedded in the top surface of the plate body. Thus, the clamping space can be better formed, and the limitation to the area of the stamping carrier can be better avoided.

Preferably, both the first plate and the plate body are square, the positioning block is disposed at one end of the plate body and extends in a lengthwise direction of the plate body where the positioning block is located, the first plate is bent upward at a position where the first plate faces the positioning block in the lengthwise direction to form a positioning boss for allowing the positioning block to be clamped therein, a height of the positioning boss matches the thickness of the positioning block, and, the positioning holes are located on a horizontal wall of the positioning boss. Thus, the first plate and the second plate are better assembled and positioned, and the first plate and the second plate can better clamp the seal and the stamping carrier.

Compared with the prior art, the present invention has the following advantages. By enabling the elastic positioning mechanisms to be inserted into the positioning holes, the relative positioning between the first plate and the second plate can be realized, the positioning of the seal can be realized, and the displacement of the seal during the stamping process can be avoided. Meanwhile, in a state where the first plate is pressed down, the elastic positioning mechanisms urge the first plate away from the second plate. Thus, the seal can be stressed uniformly, it is advantageous to uniformly stamp the character or pattern on the seal onto the stamping carrier, and the stamping quality is improved. Moreover, the elastic buffer force of the elastic positioning mechanisms can allow the user to obtain better use experience in pressing. In addition, compared with conventional magnetic positioning, in the present invention, the accuracy of positioning can be further improved by using positioning holes and elastic positioning mechanisms, and the production cost of the seal stamping machine can also be reduced.

DETAILED DESCRIPTION OF THE INVENTION

The present invention will be further described in detail with reference to the accompanying drawings by embodiments.

Embodiment 1

Figure 1:
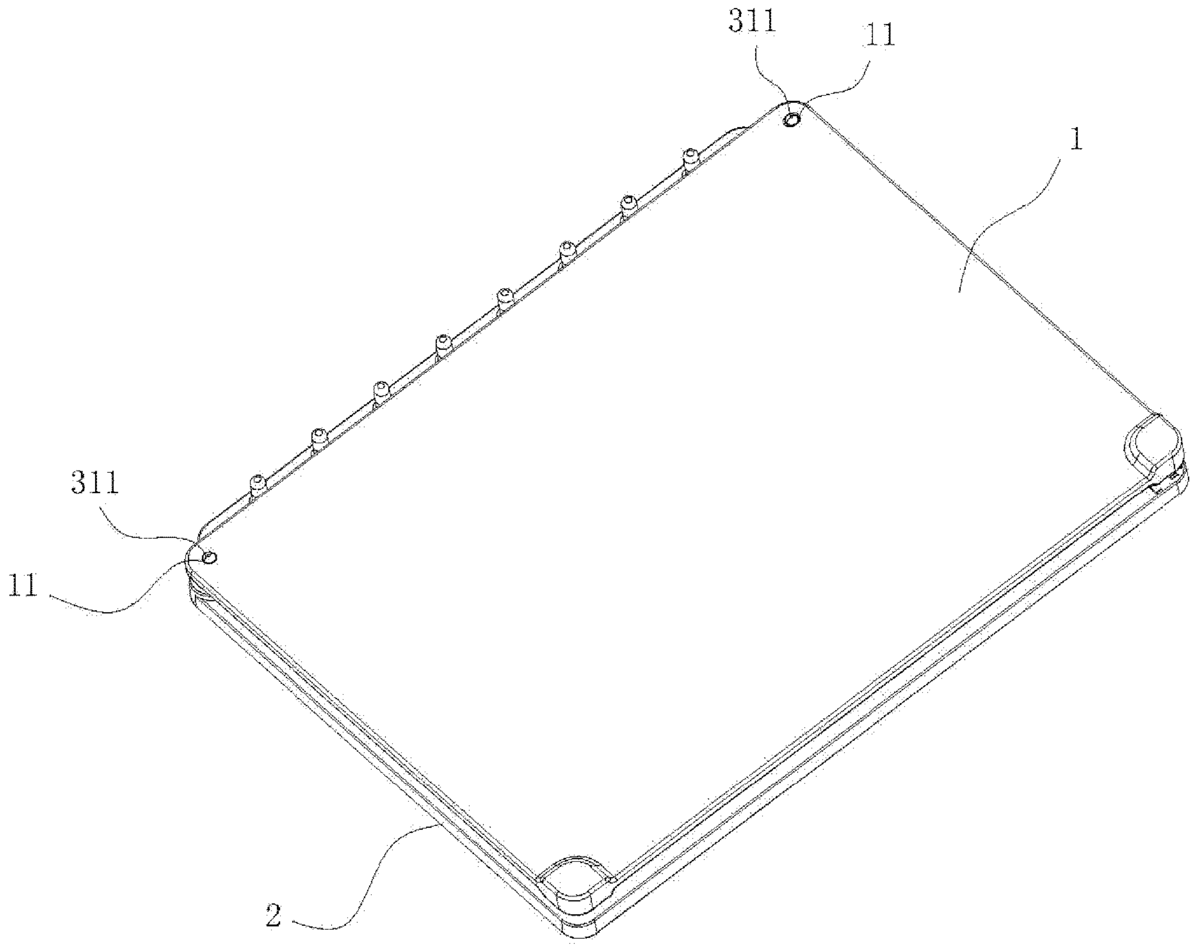
FIG. 1 is a perspective view of a seal stamping machine according to Embodiment 1 of the present invention.
Figure 2:
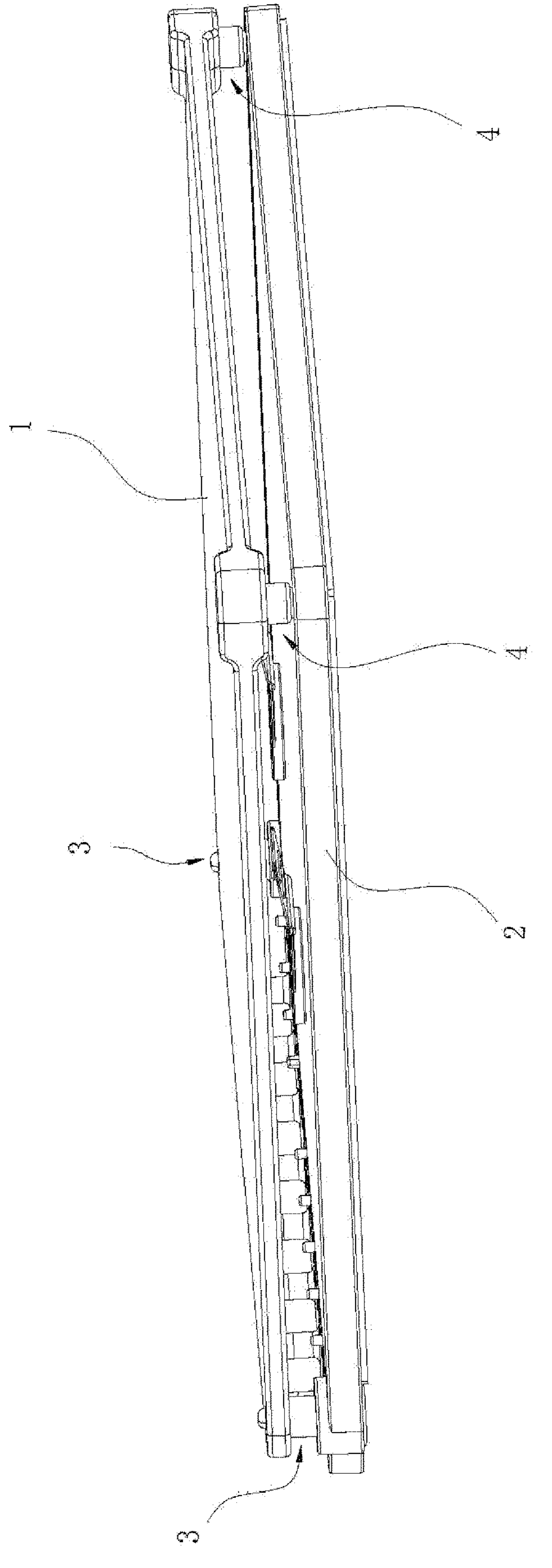
FIG. 2 is another perspective view of the FIG. 1.
Figure 3:
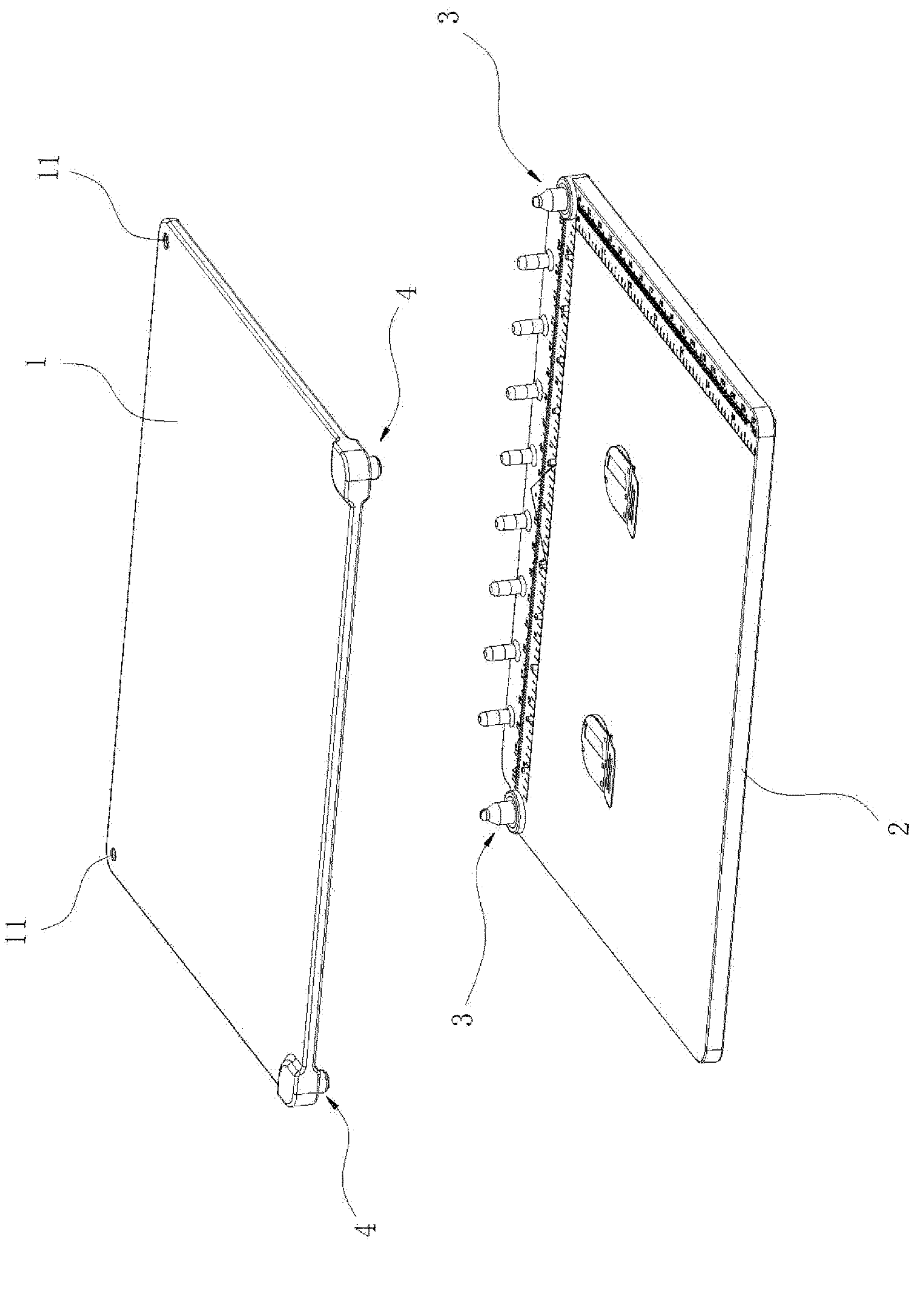
FIG. 3 is an exploded view of the seal stamping machine according to Embodiment 1 of the present invention.
Figure 4:
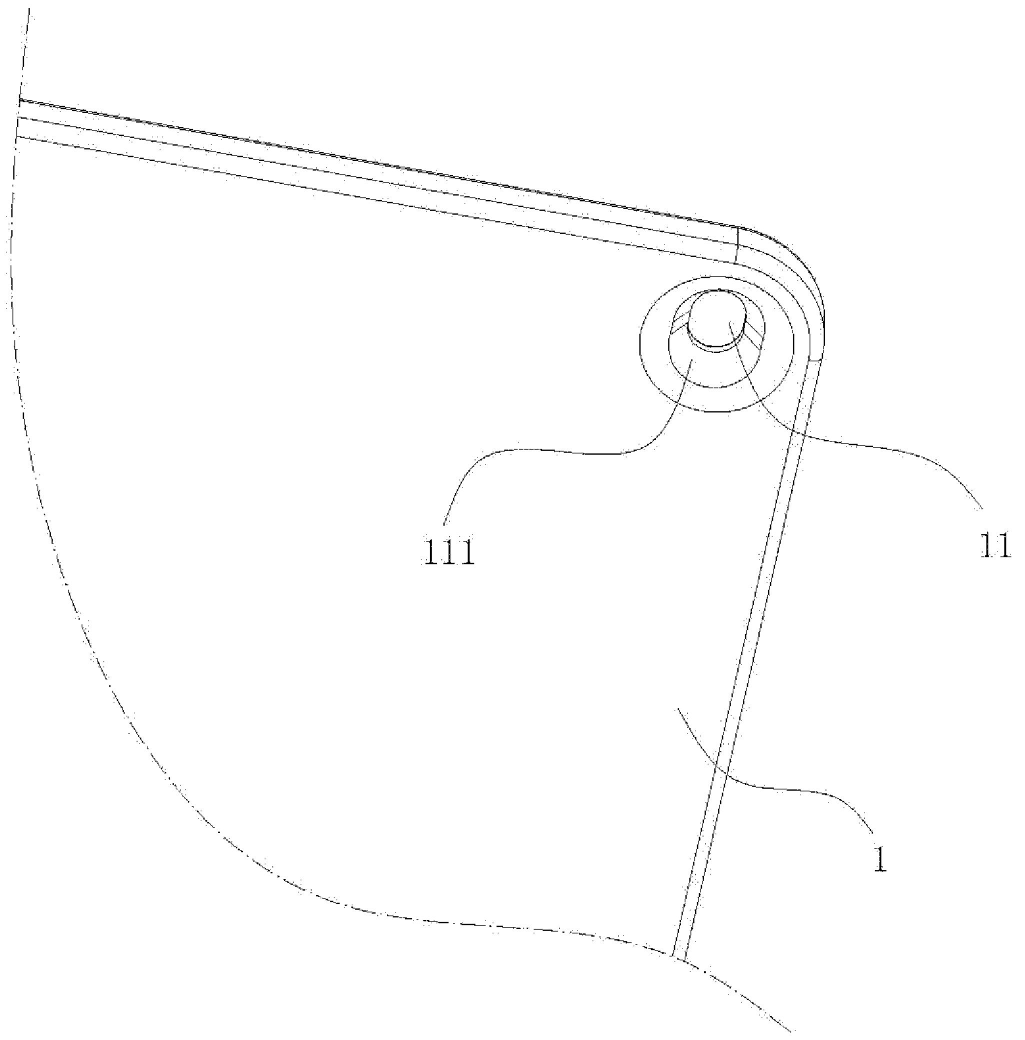
FIG. 4 is a perspective view of a part of a first plate according to Embodiment 1 of the present invention.
Figure 5:
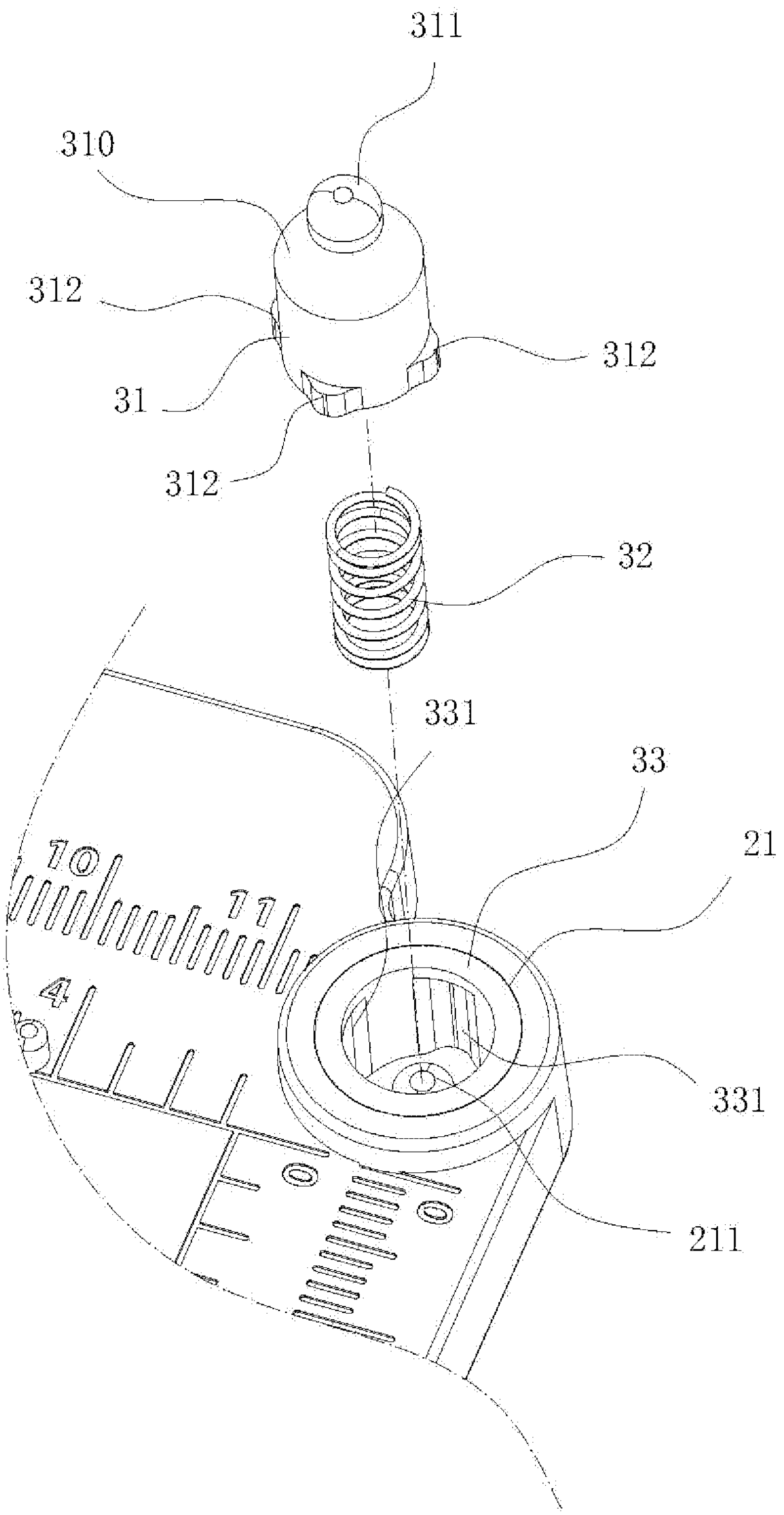
FIG. 5 is an exploded view of a part of a second plate according to Embodiment 1 of the present invention.
Figure 6:
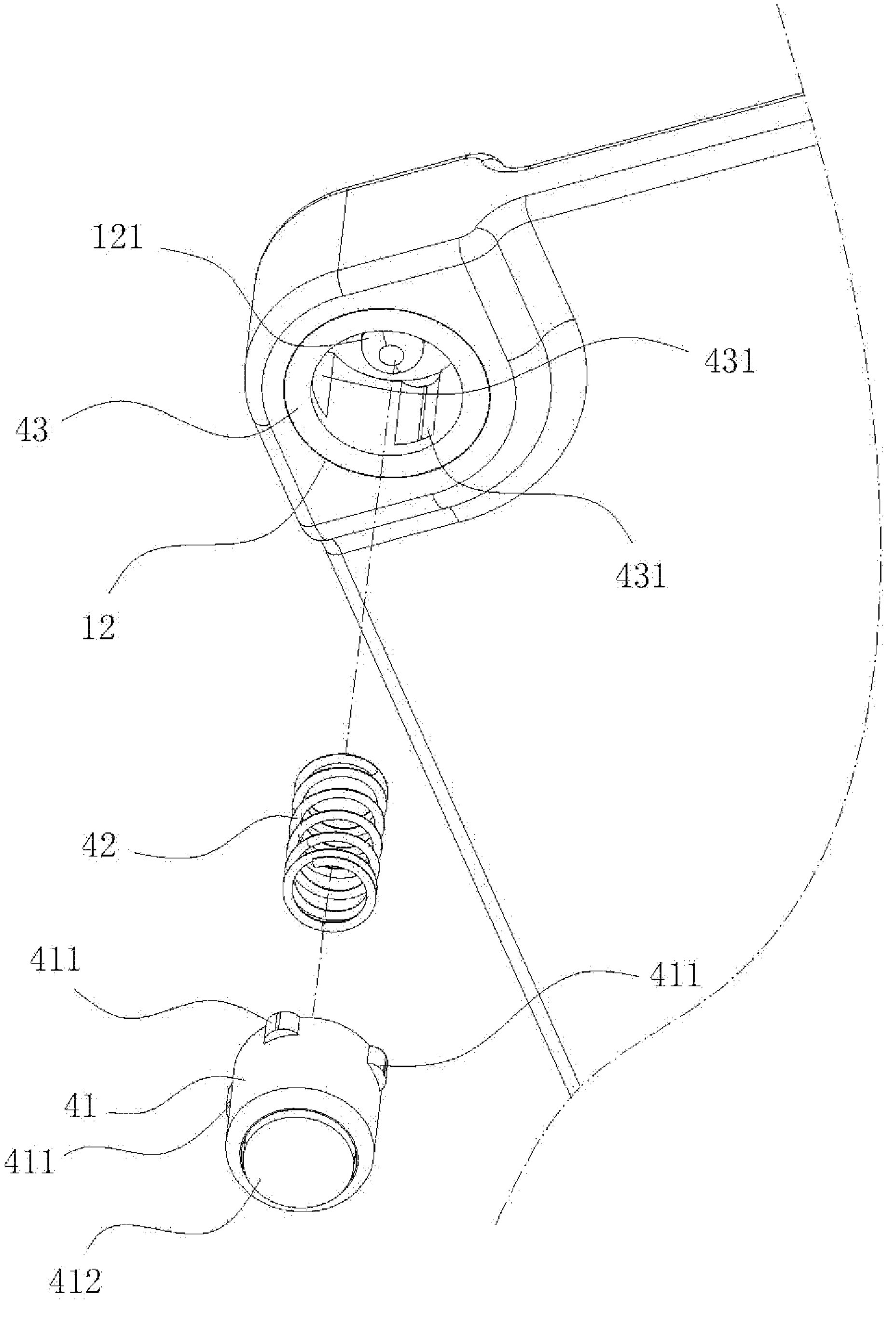
FIG. 6 is an exploded view of a part of the first plate according to Embodiment 1 of the present invention.

As shown in FIGS. 1-6, the seal stamping machine comprises a first plate 1 and a second plate 2 disposed face to face, the first plate 1 and the second plate 2 being capable of compressing a stamp and a stamping carrier located between the first plate 1 and the second plate 2; wherein, the first plate 1 has a plurality of positioning holes 11; a plurality of elastic positioning mechanisms 3 disposed on the second plate 2, each elastic positioning mechanism 3 corresponding to one of the plurality of positioning holes 11; when the first plate 1 is pressed toward the second plate 2, the elastic positioning mechanisms 3 urge the first plate 1 away from the second plate 2. By enabling the elastic positioning mechanisms 3 to be inserted in the positioning holes 11, the relative positioning between the first plate 1 and the second plate 2 can be realized, the positioning of the seal can be realized, and the displacement of the seal in the stamping process can be avoided. Meanwhile, in a state where the first plate 1 is pressed down, the elastic positioning mechanisms 3 urge the first plate 1 away from the second plate 2. Thus, the seal can be stressed uniformly, it is advantageous to uniformly stamp the character or pattern on the seal onto the stamping carrier, and the stamping quality is improved. Moreover, the elastic buffer force of the elastic positioning mechanisms 3 allows the user to obtain better use experience in pressing.

The first plate 1 and the second plate 2 can arrange face to face in various ways. In this embodiment, the first plate 1 is located above the second plate 2. When in use, a stamping carrier (a piece of paper in this embodiment) is placed on the upper surface of the second plate 2, a seal (which is generally made of silicone or rubber and has a character and/or pattern on its one surface) is then placed at a position to be stamped, and the first plate 1 is covered. The positioning holes 11 aligned with the plurality of elastic positioning mechanisms 3 are pressed down, and the seal is absorbed on the lower surface of the first plate 1. The first plate 1 is taken up, the ink is applied on the seal, and the first plate 1 is covered and pressed down, so that the character or pattern on the seal is stamped on the stamping carrier.

Further, a plurality of elastic reset mechanisms 4 is disposed on the first plate 1 or the second plate 2, when the first plate 1 is pressed down, the plurality of elastic reset mechanisms 4 and the plurality of elastic positioning mechanisms 3 are compressed together, and together urge the first plate 1 away from the second plate 2. The elastic reset mechanisms 4 can realize the function of auxiliary positioning to the stamping carrier; and, by using the elastic reset mechanisms 4 and the elastic positioning mechanisms 3, the seal can be stressed more uniformly, and the stamping quality can be further improved.

Specifically, in this embodiment, both the first plate 1 and the second plate 2 are square and flat; the elastic positioning mechanisms 3 are arranged at two corners of one end of the second plate 2, respectively; and, the each positioning hole 11 corresponding to the each elastic positioning mechanism 3 is arranged at two corners of the end of the first plate 1, respectively. Meanwhile, the elastic reset mechanisms 4 are arranged at two corners of the other end of the first plate 1, respectively. Thus, on one hand, the connection between the first plate 1 and the second plate 2 can be firmer; on the other hand, the seal can be stressed more uniformly.

Further, in this embodiment, each elastic positioning mechanism 3 comprises a vertically disposed column 31, the column 31 has a positioning protrusion 311 atop the column 31, each positioning protrusion 311 matches the corresponding positioning hole 11 in size and is capable of being inserted into the corresponding positioning hole 11; and each column 31 has a placement portion 310 under the corresponding positioning protrusion 311, the first plate 1 is placed on the placement portions 310 of the plurality of columns 31 after the plurality of positioning protrusions 311 are disposed inside the corresponding plurality of positioning holes 11 of the first plate 1. Thus, when the positioning protrusion 311 is clamped into the positioning hole 11, the elastic positioning mechanisms 3 can be inserted into the positioning holes 11 more firmly, and the firm connection between the first plate 1 and the second plate 2 can thus be realized. Further, each positioning protrusion 311 extends upward from a center of a top surface of the column 31, the top surface of each column 31 around the positioning protrusion 311 is inclined downward forming the placement portion 310; and each positioning hole 11 has a placement recess 111 extending outward at a bottom of the positioning hole 11 for receiving the corresponding placement portion 310; in a mounted state, each positioning protrusion 311 is positioned inside the corresponding positioning hole 11, and each placement portion 310 of the column 31 is positioned inside the corresponding placement recess 111. On one hand, by clamping the placement portion 310 of the column 31 into the placement recess 111, it is advantageous to guide the positioning protrusion 311 into the positioning hole 11; on the other hand, by clamping the placement portion 310 of the column 31 into the placement groove 111, the positioning between the positioning holes 11 and elastic positioning mechanisms 3 can be firmer.

Specifically, in this embodiment, each elastic positioning mechanism 3 further comprises a first mounting recess 21 vertically disposed on the top surface of the second plate 2, and a first reset spring 32 disposed inside the first mounting recess 21; a bottom of the column 31 is located inside the first mounting recess 21 and capable of moving up and down inside the first mounting recess 21, and the first reset spring 32 is limited between a bottom of the first mounting recess 21 and the bottom of the column 31. On one hand, the first reset spring 32 and the column 31 can be mounted firmly; on the other hand, the first reset spring 32 can fully provide a elastic force in the pressing process. Further, a first guide sleeve 33 is disposed inside the first mounting recess 21, the first guide sleeve 33 has a plurality of first guide grooves 331 vertically formed at intervals on an annular inner surface of the first guide sleeve 33; correspondingly, the column 31 has a plurality of first guide protrusions 312 protruding at intervals on a periphery of the bottom of the column 31, each first guide protrusion 312 is inserted into the corresponding first guide groove 331 and is capable of moving up and down along the corresponding first guide groove 331. By enabling the first guide protrusions 312 on the column 31 being inserted into the first guide grooves 331 on the first guide sleeve 33, the column 31 can move up and down more stably, the seal can be subjected to a more stable downward pressure, and the stamped character or pattern can be more uniform and complete. In this embodiment, to realize the firm mounting of the first reset spring 32, a first mounting convex column 211 is vertically fixed on an inner bottom surface of the first mounting groove 21, and a lower end of the first reset spring 32 is sleeved on the first mounting convex column 211. During assembly, an upper end of the column 31 is inserted into the first guide sleeve 33, and then the column 31 and the first guide sleeve 33 are inserted into the first mounting groove 21 and the first guide sleeve 33 is fixed to the first mounting groove 21.

Further, the plurality of elastic reset mechanisms 4 is disposed on the first plate 1, each elastic reset mechanism 4 comprises a second mounting recess 12 vertically disposed on a bottom surface of the first plate 1, a second reset spring 42 disposed inside the second mounting recess 12, and a press cap 41 having a top and a free end; the top of the press cap 41 is inserted into the corresponding second mounting recess 12 and is capable of moving up and down inside the corresponding second mounting recess 12, and the second reset spring 42 is limited between a top of the second mounting recess 12 and the top of the press cap 41. Thus, on one hand, the second reset spring 42 and the press cap 41 can be mounted firmly; on the other hand, the second reset spring 42 can fully provide an elastic force in the pressing process. Further, a second guide sleeve 43 is disposed inside the second mounting recess 12, the second guide sleeve 43 has a plurality of second guide grooves 431 vertically formed at intervals on an annular inner surface of the second guide sleeve 43; correspondingly, the press cap 41 has a plurality of second guide protrusions 411 protruding at intervals on a periphery of the top of the press cap 41, each second guide protrusion 411 is inserted into the corresponding second guide groove 431 and is capable of moving back and forth along the corresponding second guide groove 431. By limiting the second guide protrusions 411 on the press cap 41 in the second guide grooves 431 on the second guide sleeve 43, the press cap 41 can move up and down more stably, and the seal can be stressed more uniformly. In this embodiment, to realize the firm mounting of the second reset spring 42, a second mounting convex column 121 is vertically fixed on the inner bottom surface of the second mounting groove 12, and the lower end of the second reset spring 41 is sleeved on the second mounting convex column 121. During assembly, the lower end of the press cap 41 is inserted into the second guide sleeve 43, and then the press cap 41 and the second guide sleeve 43 are inserted into the second mounting groove 12 and the second guide sleeve 43 is fixed to the second mounting groove 12. Furthermore, an antiskid pad 412 is disposed at the free end of the press cap 41. By arranging the antiskid pad 412, the first plate 1 can be prevented from moving horizontally on the stamping carrier, and the stability of stamping and positioning can be improved.

Embodiment 2

Figure 7:
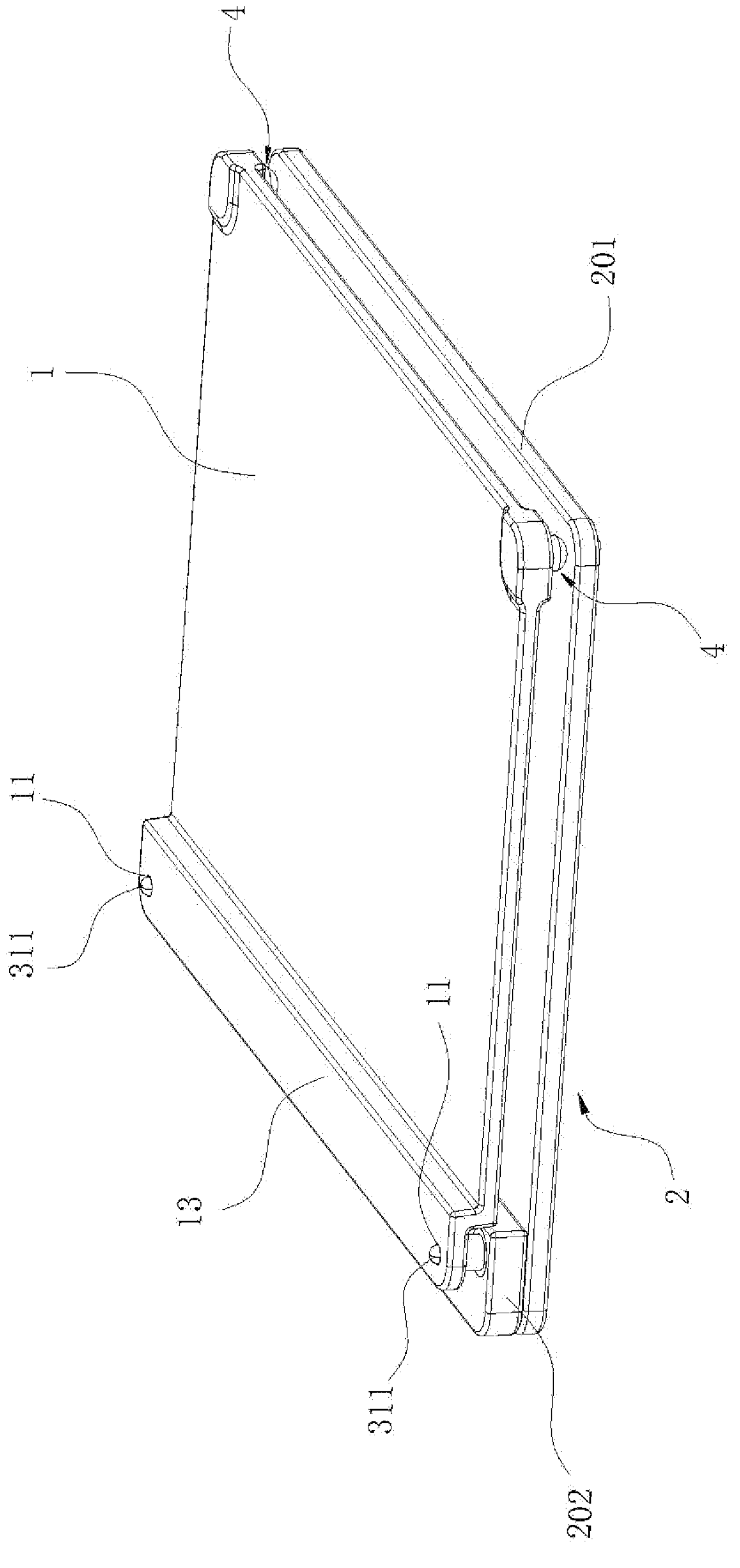
FIG. 7 is a perspective view of a seal stamping machine according to Embodiment 2 of the present invention.
Figure 8:
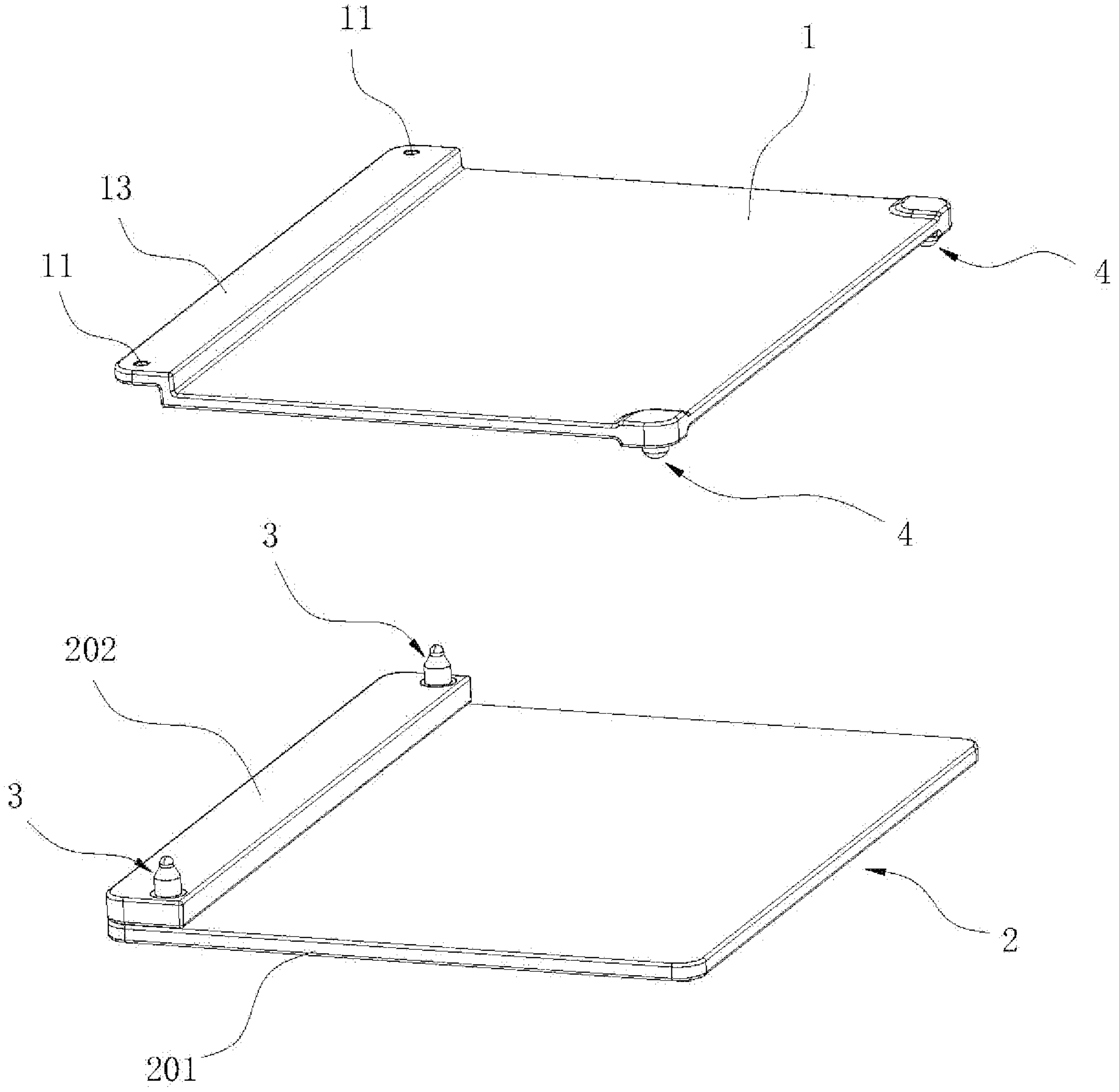
FIG. 8 is an exploded view of the seal stamping machine according to Embodiment 2 of the present invention.
Figure 9:
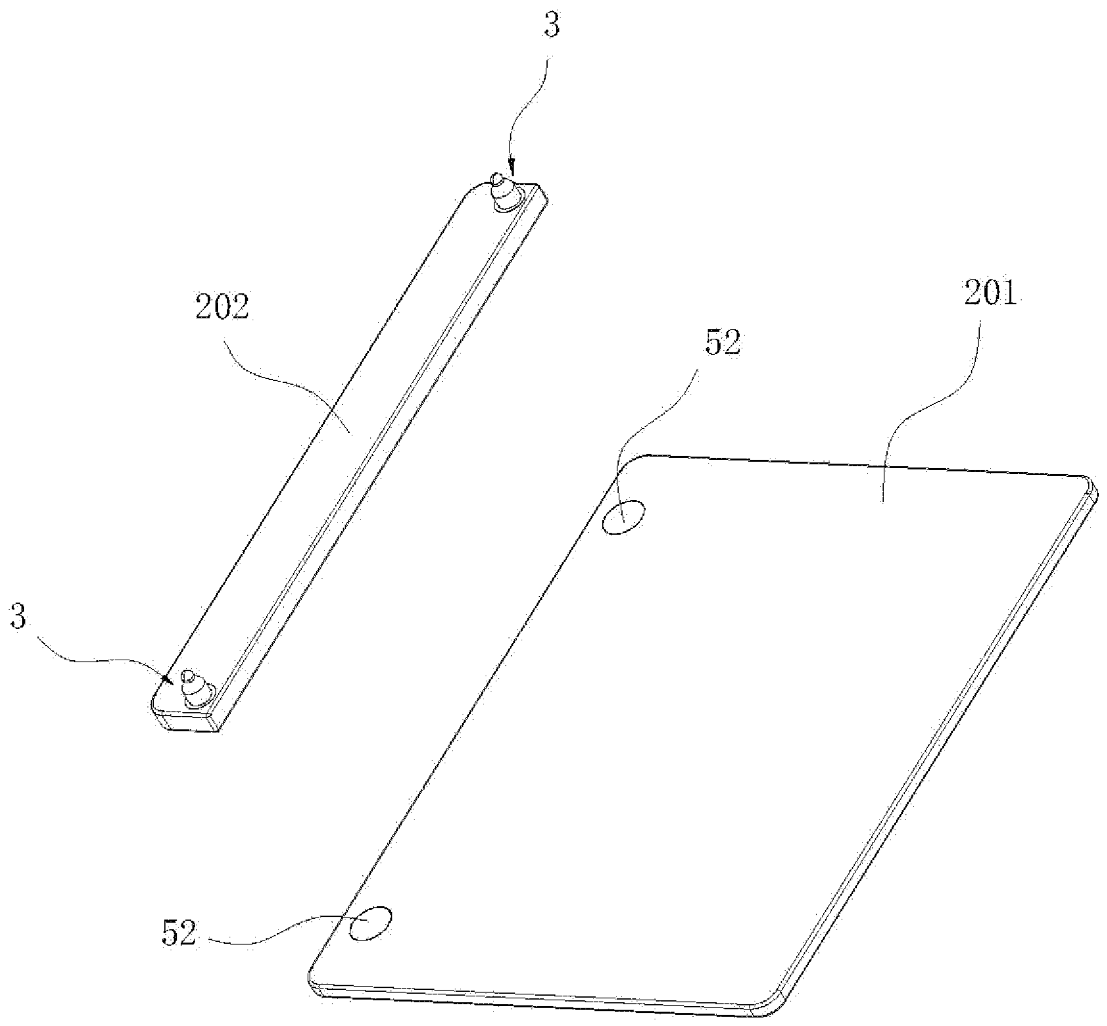
FIG. 9 is an exploded view of a part of a second plate according to the Embodiment 2 of the present invention.
Figure 10:
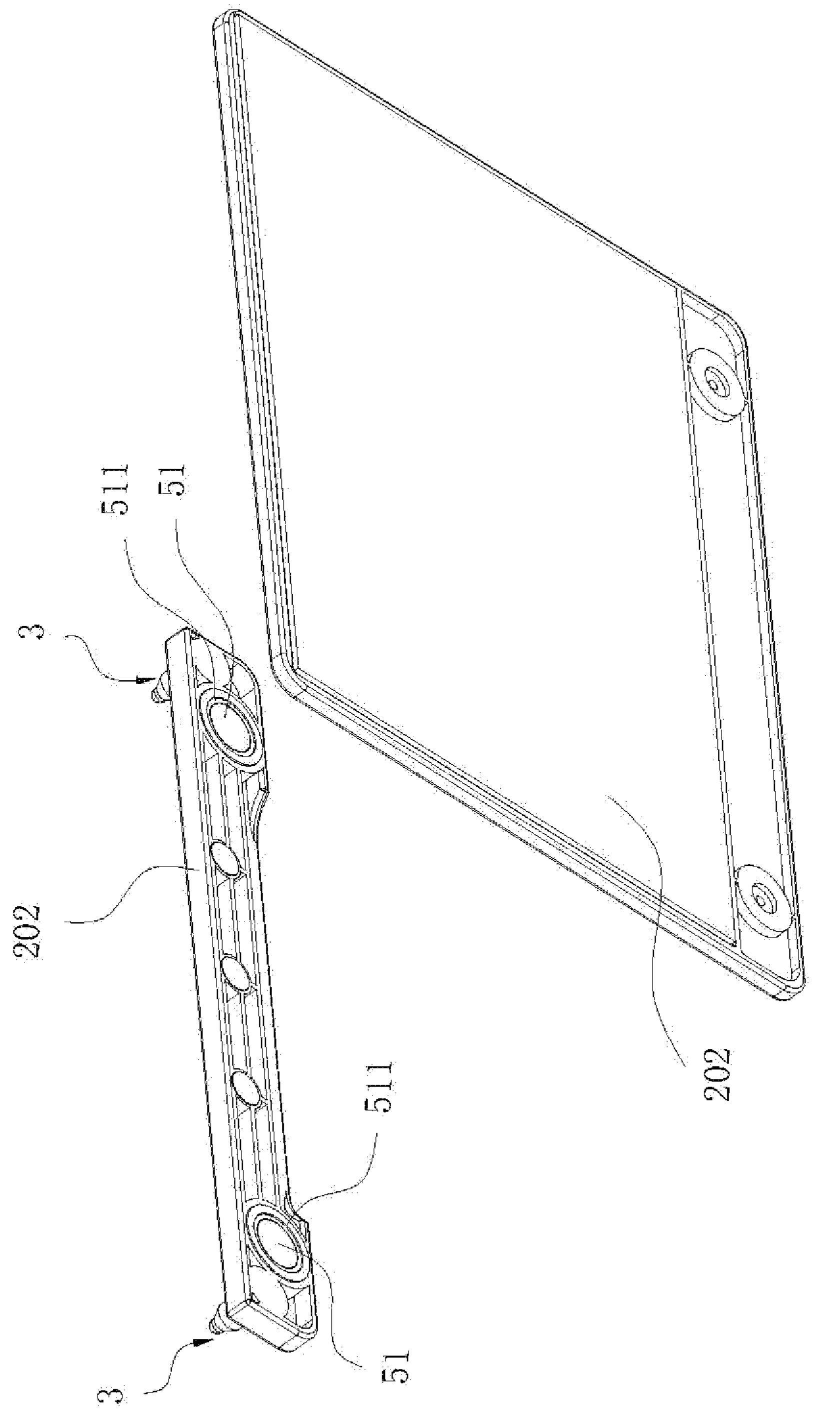
FIG. 10 is another perspective view of the FIG. 9.

FIGS. 7-10 show a second embodiment of the stamping machine. Compared with Embodiment 1, the seal stamping machine of this embodiment has the difference that, in this embodiment, the second plate 2 comprises a plate body 201 and a positioning block 202, the positioning block 202 is detachably disposed at one end of a top surface of the plate body 201, a bottom surface of the positioning block 202 is a plane, a clamping space for clamping a stamping carrier is defined between the bottom surface of the positioning block 202 and the top surface of the plate body 201, and, the plurality of elastic positioning mechanisms 3 is disposed on the positioning block 202, and the first plate 1 has a plurality of positioning holes 11 facing the positioning block 202. Since the elastic positioning mechanisms 3 are arranged on the positioning block 202 and a clamping space is defined between the bottom surface of the positioning block 202 and the upper surface of the plate body 201, the elastic positioning mechanisms 3 will not limit the area of the stamping carrier, so that the area of the stamping carrier of the present invention can be theoretically be infinite.

The detachable connection between the positioning block 202 and the plate body 202 may be implemented in various ways. In this embodiment, preferably, the positioning block 202 and the plate body 201 are magnetically connected to each other through a magnetic component, so that it is convenient for the assembly and disassembly of the positioning block 202 and the plate body 201. Specifically, the magnetic component comprises a first magnetic block 51 embedded in the bottom surface of the positioning block 202 and a second magnetic block 52 embedded in the top surface of the plate body 201. An exposed surface of the first magnetic block 51 is basically flush with the bottom surface of the positioning block 202, and an exposed surface of the second magnetic block 51 is basically flush with the upper surface of the plate body 201. Thus, the clamping space can be better formed, and the limitation to the area of the stamping carrier can be better avoided. Preferably, an antiskid gasket 511 is disposed at the periphery of the first magnetic block 51, and the bottom surface of the antiskid gasket 511 is slightly higher than the bottom surface of the first magnetic block 51. Thus, by arranging the antiskid gasket 511, on one hand, the first magnetic block 51 and the second magnetic block 52 can be prevented from damage by collision during the mutual magnetic attraction process; on the other hand, the horizontal sliding between the positioning block 202 and the plate body 201 can be prevented.

Specifically, in this embodiment, both the first plate 1 and the second plate 2 are square, the positioning block 202 is disposed at one end of the plate body 201 and extends in a lengthwise direction of the plate body 201 where the positioning block 202 is located, the first plate 1 is bent upward at a position where the first plate 1 faces the positioning block 202 in the lengthwise direction to form a positioning bump 13 for allowing the positioning block 202 to be clamped therein, a height of the positioning bump 13 matches the thickness of the positioning block 202, and, the positioning holes 11 are located on a horizontal wall of the positioning bump 13. Thus, the first plate 1 and the second plate 2 are better assembled and positioned, and the first plate 1 and the second plate 2 can better clamp the seal and the stamping carrier.

The invention claimed is:

1. A seal stamping machine comprising a first plate (1) and a second plate (2) disposed face to face;

the first plate (1) and the second plate (2) being capable of compressing a stamp and a stamping carrier located between the first plate (1) and the second plate (2);

wherein, the first plate (1) has a plurality of positioning holes (11), and is disposed on the second plate (2);

a plurality of elastic positioning mechanisms (3) is disposed on the second plate (2), each elastic positioning mechanism (3) corresponding to one of the plurality of positioning holes (11);

each elastic positioning mechanism (3) comprises a vertically disposed column (31), the vertically disposed column (31) has a positioning protrusion (311) atop the vertically disposed column (31), each positioning protrusion (311) matches the corresponding positioning hole (11) in size and is capable of being inserted into the corresponding positioning hole (11);

and each vertically disposed column (31) has a placement portion (310) under the corresponding positioning protrusion (311), the first plate (1) is placed on the placement portions (310) of the plurality of vertically disposed columns (31) after the plurality of positioning protrusions (311) are disposed inside the corresponding plurality of positioning holes (11) of the first plate (1);

when the first plate (1) is pressed toward the second plate (2), the elastic positioning mechanisms (3) urge the first plate (1) away from the second plate (2).

2. The seal stamping machine of claim 1, wherein each positioning protrusion (311) extends upward from a center of a top surface of the vertically disposed column (31), the top surface of each vertically disposed column (31) around the positioning protrusion (311) is inclined downward forming the placement portion (310);

and each positioning hole (11) has a placement recess (111) extending outward at a bottom of the positioning hole (11) for receiving the corresponding placement portion (310);

in a mounted state, each positioning protrusion (311) is positioned inside the corresponding positioning hole (11), and each placement portion (310) of the column (31) is positioned inside the corresponding placement recess (111).

3. The seal stamping machine of claim 1, wherein each elastic positioning mechanism (3) further comprises a first mounting recess (21) vertically disposed on a top surface of the second plate (2), and a first reset spring (32) disposed inside the first mounting recess (21);

a bottom of the vertically disposed column (31) is located inside the first mounting recess (21) and capable of moving up and down inside the first mounting recess (21), and the first reset spring (32) is limited between a bottom of the first mounting recess (21) and the bottom of the vertically disposed column (31).

4. The seal stamping machine of claim 3, wherein a first guide sleeve (33) is disposed inside the first mounting recess (21), the first guide sleeve (33) has a plurality of first guide grooves (331) vertically formed at intervals on an annular inner surface of the first guide sleeve (33);

correspondingly, the vertically disposed column (31) has a plurality of first guide protrusions (312) protruding at intervals on a periphery of the bottom of the vertically disposed column (31), each first guide protrusion (312) is inserted into the corresponding first guide groove (331) and is capable of moving up and down along the corresponding first guide groove (331).

5. The seal stamping machine of claim 1, wherein a plurality of elastic reset mechanisms (4) is disposed on the first plate (1) or the second plate (2), when the first plate (1) is pressed down, the plurality of elastic reset mechanisms (4) and the plurality of elastic positioning mechanisms (3) are compressed together, and together urge the first plate (1) away from the second plate (2).

6. The seal stamping machine of claim 5, wherein the plurality of elastic reset mechanisms (4) is disposed on the first plate (1), each elastic reset mechanism (4) comprises a second mounting recess (12) vertically disposed on a bottom surface of the first plate (1), a second reset spring (42) disposed inside the second mounting recess (12), and a press cap (41) having a top and a free end;

the top of the press cap (41) is inserted into the corresponding second mounting recess (12) and is capable of moving up and down inside the corresponding second mounting recess (12), and the second reset spring (42) is limited between a top of the second mounting recess (12) and the top of the press cap (41).

7. The seal stamping machine of claim 6, wherein a second guide sleeve (43) is disposed inside the second mounting recess (12), the second guide sleeve (43) has a plurality of second guide grooves (431) vertically formed at intervals on an annular inner surface of the second guide sleeve (43);

correspondingly, the press cap (41) has a plurality of second guide protrusions (411) protruding at intervals on a periphery of the top of the press cap (41), each second guide protrusion (411) is inserted into the corresponding second guide groove (431) and is capable of moving up and down along the corresponding second guide groove (431).

8. The seal stamping machine of claim 6, wherein an antiskid pad (412) is disposed at the free end of the press cap (41).

9. The seal stamping machine of claim 8, wherein at least two elastic positioning mechanisms (3) are located at intervals at one side of the second plate (2), at least two elastic reset mechanisms (4) are located at intervals at a side of the second plate (2) opposite to the two elastic positioning mechanisms (3), and correspondingly, at least two positioning holes (11) on the first plate (1) correspond to the elastic positioning mechanisms (3).

10. The seal stamping machine of claim 1, wherein the second plate (2) comprises a plate body (201) and a positioning block (202), the positioning block (202) is detachably disposed at one end of a top surface of the plate body (201), a bottom surface of the positioning block (202) is a plane, a clamping space for clamping a stamping carrier is defined between the bottom surface of the positioning block (202) and the top surface of the plate body (201), and, the plurality of elastic positioning mechanisms (3) is disposed on the positioning block (202).

11. The seal stamping machine of claim 10, wherein the positioning block (202) and the plate body (201) are magnetically connected to each other through a magnetic component.

12. The seal stamping machine of claim 11, wherein the magnetic component comprises a first magnetic block (51) embedded in the bottom surface of the positioning block (202) and a second magnetic block (52) embedded in the top surface of the plate body (201).

13. The seal stamping machine of claim 10, wherein both the first plate (1) and the plate body (201) are square, the positioning block (202) is disposed at one end of the plate body (201) and extends in a lengthwise direction of the plate body (201) where the positioning block (202) is located, the first plate (1) is bent upward at a position where the first plate (1) faces the positioning block (202) in the lengthwise direction to form a positioning bump (13) for allowing the positioning block (202) to be clamped therein, a height of the positioning bump (13) matches a thickness of the positioning block (202), and, the positioning holes (11) are located on a horizontal wall of the positioning bump (13).

* * * * *